(12) United States Patent
Mitchell et al.

(10) Patent No.: US 11,677,708 B2
(45) Date of Patent: Jun. 13, 2023

(54) ELECTRONIC MESSAGES INTEGRATED WITH REAL-TIME COLLABORATION

(71) Applicant: Ginger Labs, Inc., San Francisco, CA (US)

(72) Inventors: Garrett Mitchell, San Francisco, CA (US); Colin Gilboy, Narberth, PA (US)

(73) Assignee: Ginger Labs, Inc., San Francisco, CA (US)

( * ) Notice: Subject to any disclaimer, the term of this patent is extended or adjusted under 35 U.S.C. 154(b) by 0 days.

(21) Appl. No.: 17/359,055

(22) Filed: Jun. 25, 2021

(65) Prior Publication Data

US 2021/0409365 A1 Dec. 30, 2021

Related U.S. Application Data

(60) Provisional application No. 63/046,388, filed on Jun. 30, 2020.

(51) Int. Cl.
*H04L 51/42* (2022.01)
*H04L 51/216* (2022.01)

(52) U.S. Cl.
CPC ............ *H04L 51/42* (2022.05); *H04L 51/216* (2022.05)

(58) Field of Classification Search
CPC ........ H04L 51/22; H04L 51/16; H04L 51/046
See application file for complete search history.

(56) References Cited

U.S. PATENT DOCUMENTS

| | | | |
|---|---|---|---|
| 2010/0070880 A1* | 3/2010 | Chinta ................. | G06Q 10/107 715/752 |
| 2015/0277724 A1* | 10/2015 | Masterson .............. | G06F 16/22 715/753 |
| 2015/0277725 A1* | 10/2015 | Masterson .......... | G06F 3/04842 715/753 |
| 2015/0281148 A1* | 10/2015 | Masterson ............. | G06Q 10/10 715/752 |
| 2019/0342248 A1* | 11/2019 | Thompson ............ | G06F 40/166 |
| 2019/0372922 A1* | 12/2019 | Masterson ............ | H04L 51/046 |

* cited by examiner

*Primary Examiner* — Cheikh T Ndiaye
(74) *Attorney, Agent, or Firm* — Baker Botts L.L.P.

(57) ABSTRACT

In one embodiment, a computer-implemented method comprises sending, by a client application to an email server, a first request to access an email message; receiving, in response to the first request, email message data, the email message data specifying a note identifier of a note; sending, to an application server, a second request to access the note based on the note identifier; receiving, in response to the second request, note data that defines, at least in part, content of the note; controlling a display device to display, based at least in part on the email message data and the note data, the email message and the note in-line with the email message.

12 Claims, 12 Drawing Sheets

FIG. 5

Hi there, Colin!
Started Monday, May 18 with Colin bagel demo 9:10 AM
Let's make a grocery list Colin 9:10 AM
Great! Let's get some cheddar cheese bagel demo 9:11 AM (edited) — 504
And also some parmesan cheese!
I'll head to the store tonight.

Groceries
- Cheddar
- Parmesan
- Provolone

Modified on 05/18

Sounds delicious — 504

Reply

ELECTRONIC MESSAGES INTEGRATED WITH REAL-TIME COLLABORATION

BENEFIT CLAIM

This application claims the benefit under 35 U.S.C. § 119 of provisional application 63/046,388, filed Jun. 30, 2020, the entire contents of which are hereby incorporated by reference as if fully set forth herein.

FIELD OF THE DISCLOSURE

One technical field of the present disclosure is computer-implemented electronic mail (email) services or programs. Another technical field is computer-implemented task management services or programs.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Email applications are used with computers by many on a regular basis. Other types of productivity applications are also commonly used, such as applications for notetaking, calendaring, and messaging. Email applications, however, are generally not well integrated with other productivity applications. Consequently, users may find that they need to have downloaded, or otherwise have accessible, a variety of distinct applications on their computing devices. Users open, access, and cycle through their email and other applications, each having a distinct interface, in a rather disjointed fashion throughout their day. Associating an email conversation with other digital data elements, such as tasks, calendar items, or files is difficult and inefficient. This wastes time, and requires using large amounts of computer memory, data storage, CPU cycles, and other computing resources.

SUMMARY OF THE INVENTION

The appended claims may serve as a summary of the invention.

BRIEF DESCRIPTION OF THE DRAWINGS

FIG. 5 illustrates an example GUI of an email with an in-line note according to an embodiment.

DESCRIPTION OF EXAMPLE EMBODIMENTS

Figure 1:
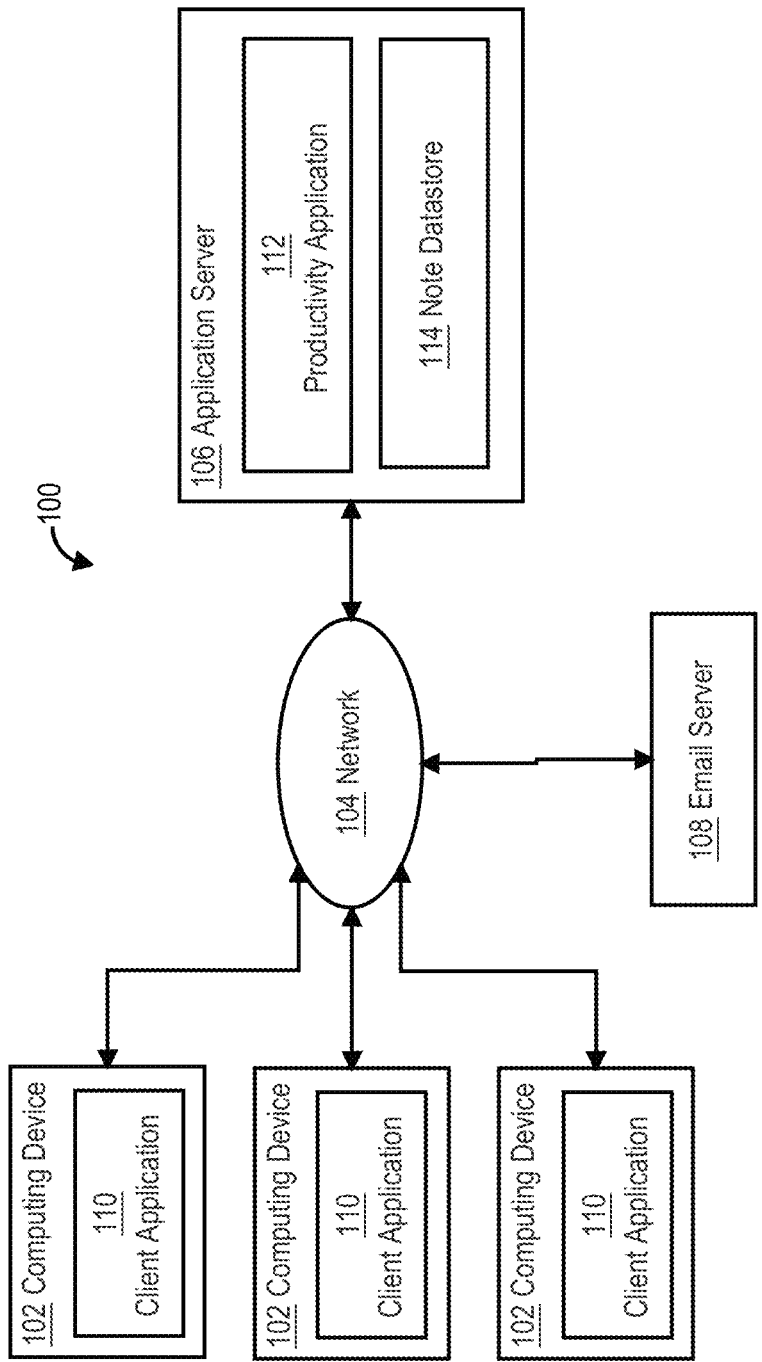
FIG. 1 illustrates a computer system configured to provide a computer-implemented application that integrates email and one or more other productivity tools, according to an embodiment.

In the following description, for the purposes of explanation, numerous specific details are set forth in order to provide a thorough understanding of the example embodiments of the present disclosure. It will be apparent, however, that the example embodiments may be practiced without these specific details. In other instances, well-known structures and devices are shown in block diagram form in order to avoid unnecessarily obscuring the example embodiments.

General Overview

The present disclosure provides a computer-implemented application program (application) that is programmed to integrate email and one or more other productivity tools, such as a real-time collaboration tool. According to an embodiment, the application provides an integrated interface that provides live, interactive notes within one or more email messages. The one or more email messages include static content, and may be part of a common email thread, for example. The collaboration tool is implemented to distribute content via the live notes almost as fast as users can type messages on a keyboard or speak to a voice recognition unit, and consequently is referred to variously throughout this description as a real-time collaboration tool. The collaboration tool facilitates transmission of the live notes to user accounts or recipients that are provided access. A note is collaborative in real-time and can be edited by one or more user accounts simultaneously. The collaboration tool provides functionality that includes, for example, entering text, creating tables and to-do lists, attaching files, managing reminders, and/or assigning or flagging content to one or more user accounts. The collaboration tool acts as a discussion medium as well as a container of information that a set of users may consult, search, review, and edit freely at a later time.

The integrated interface is useful to consolidate relevant information between the email messages and the live notes to promote collaborative, productive, and engaged interaction, and to empower users with greater productivity. In an example, the integrated interface provides real-time notes and other functionality in-line with email messages. Within an email message, a note may be viewed, edited, deleted, and sent to other users. This new computer functionality allows users to avoid opening and accessing distinct applications to utilize different productivity tools. In an example, the application incorporates data defining a note into data defining an email. For instance, note data may be accessed via a static link in an email message.

According to an embodiment, a client computing device is configured to execute a client application that provides an integrated productivity tool using an email message incorporated with live, interactive notes. The client application, to render a live note and an email message, sends an access request to an email server. In response to sending the access request, the client application receives email message data that specifies a note identifier of a note. In an example, the email message data specifies the note identifier via a static link in the email message. The client application parses the note identifier from the email message data and sends a note access request to an application server. The note access request includes the note identifier. The client application receives note data that defines content of the note in response to sending the note access request. The client application controls a display device to display, based at least in part on the email message data and the note data, the live note within, or in-line with, the email message.

According to another embodiment, the client application receives an instruction to add a live note to an email message. In response to receiving the instruction, the client application requests a unique note identifier from an application server. The client application provides a user interface to edit the note. As the client application receives instructions via the user interface to edit the note, the client application sends note data to the application server. The note data includes, for example, the note identifier and edit operations that define content of the note. The application server manages note data in association with respective note identifiers in order to provide note data when requested by a client application to implement the real-time collaboration tool among various computing devices. When a draft of the email message including the note is saved, or when the email message including the note is sent to a recipient, the client application sends an instruction to the email server to save or send the email message with a link to the note embedded in the email message. The link to the note specifies the unique note identifier received from the application server.

These and other techniques described herein provide improvements in the technical field of computer-implemented productivity applications by enhancing an email application with other productivity tools, such as live, interactive notes, which helps to reduce the need for opening, accessing, and cycling through email and one or more other applications, each application having a distinct interface. Other embodiments, features and aspects will become apparent from the disclosure as a whole.

Structural and Functional Overview

FIG. 1 illustrates a computer system configured to provide a computer-implemented application that integrates email and one or more other productivity tools, according to an embodiment. FIG. 1, and the other drawing figures and all of the description and claims in this disclosure, are intended to present, disclose and claim a technical system and technical methods in which programmed computers in a particular manner, using a distributed computer system of a particular design, execute functions that have not been available before to provide a practical application of computing technology to the problem of computer-assisted electronic digital collaboration. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In FIG. 1, client computing devices 102 are coupled via network 104 to application server 106 and email server 108. Any number of client computing devices 102 may be used in the system 100 and three are shown in FIG. 1 for purposes of providing an example. A computing device 102 is generally configured to receive input via a keyboard, pointing device, or other input-output device, to provide a display via a display device, and to communicate with network 104 via one or more network interfaces. In an embodiment, a computing device 102 may comprise a mobile computing device, desktop computer, laptop computer, or other end station. In an embodiment, a computing device 102 executes an operating system and a client application program 110 that are configured to receive, render, and cause display of an application interface based upon structured markup language code or instructions in HTML, XML, or similar languages. Application-specific client software is installed on a computing device 102 according to an example, but is not required. Alternatively or in combination, a computing device 102 may use web browsers to communicate with the application server 106 and the email server 108, and to thereby execute the client application program 110.

The computing device 102 executes the client application program 110 to provide an email inbox GUI that provides functionality for a user to create, manage, and edit notes. When the GUI receives an instruction to create a new note, the client application 110 sends a request to the productivity application for a unique note identifier for the new note. The GUI is also configured to receive one or more user accounts that are granted access to a new or existing note. A user account may be identified using a unique account identifier, such as a handle, alias, e-mail address, name, or phone number. In this example, the client application 110 may provide data specifying the one or more user accounts to the application server 106, which is configured to implement access controls to selectively provide access to note content upon request by other computing devices associated with user accounts.

Further, the client application 110 is programmed to receive, via the GUI, content for each note, which may include free-form text, tables, checklists, and/or media attachments, for example. As the client application 110 receives content and edits to a note, the client application sends corresponding note data to the application server 106, which manages distribution of the note data to other computing devices upon request to enable real-time, interactive collaboration using notes.

According to an embodiment, the client application 110 receives a request or instruction to include a note in an email message. Upon saving a draft of the email message and note, or sending the email message and note to one or more recipients, the client application 110 sends instructions to the email server 108, via the network 104, to include the note within the email message, such as by adding a link to the note within the email message. Opening the note link, for example, by clicking on the link, directs a computing device to the application server 106 to retrieve associated note data used to render and display the note.

The network 104 broadly represents any combination of one or more local area networks, wide area networks, campus networks, and/or internetworks. Packet-switched networks may be used with networking infrastructure devices such as switches and routers that are programmed to communicate packet data based on internet protocol (IP), a transport protocol such as TCP or UDP, and higher-order protocols at any of several different logical layers, such as those defined by the Open Systems Interconnect (OSI) multi-layer internetworking model.

The application server 106 is a computing device that hosts or executes a productivity application 112, which is illustrated as a single functional element in FIG. 1, but may be organized using a plurality of different computer programs, processes, or other software elements. The productivity application 112 is a computer-executed system that manages live, interactive notes that the client application 110 and email server 108 may include within an email message or thread of email messages. The productivity application 112 is programmed to receive, from a computing device 102, a request or instructions to create a note that may be added in an email message. In response to receiving the request to create a note, the productivity application 112 provides a unique note identifier to the computing device 102 and associated client application 110.

FIG. 1 illustrates the application server 106 including a note datastore 114 for storing note data from client applications 110 that defines content of a note and other aspects or metadata of the note. Content data for a note includes operations that define the content of the note. For example, the content data stores each keystroke operation used to edit a note using a data structure. An example data structure is a conflict-free replicated data type (CRDT), which the application server 106 uses to track and store sequences of keystroke operations that define the content of each note.

As a computing device 102 and client application 110 is used to edit a note in an email message or email thread, the computing device sends CRDT data in real-time for each edit operation to the application server 106. The application server 106 stores the CRDT data in the note datastore 114, and associates the CRDT data with a respective note identifier. In an example, the application server 106 also associates the CRDT data of a particular note, or a portion of a note, with a user account that generated the CRDT data to edit the note. By associating the CRDT data with a note ID and a user account, the application server 106 and productivity application 112 enable different user accounts to edit the same portions of a note, and contributes to the real-time, interactive technical character of the notes within an email message.

Other stored aspects or metadata of the note may specify account identifiers that are granted access to notes, and privacy controls. Example privacy controls include a public setting that allows any computing device with a note link to access a note, a private setting that allows only selected user accounts to access a note link, among other possible options.

Further, the application server 106 uses the CRDT data and other note metadata to send note updates to one or more user accounts that are granted access or otherwise request access via a public or private link to the note. The CRDT data provide a detailed history of edits to each note, and so, the application server 106 may also use the CRDT data as an archive of prior versions of a note.

In an embodiment, the application server 106 stores note data separately from email data, which the email server 108 stores and manages. This allows independent management of notes and email messages. Illustratively, notes and email messages can be edited and deleted independently and selectively. The application server 106 stores the CRDT data and possibly other content data, such as media content, in the note datastore 114 as long as a note is saved. But, if an entire note is deleted, then the application server 106 also deletes the corresponding CRDT data.

The email server 108 receives, stores, transmits, and manages email data, which includes, for example, email message content, email message and/or email message thread identifiers, and user account login credentials. The email server 108 may be a Gmail server provided by Google LLC of Mountain View, Calif. In other embodiments, email server 108 is a mail transfer agent (MTA) hosted on local hardware, in a datacenter or in a public cloud computing system. Computing devices 102 and application server 106 communicate with the email server 108 via one or more application program interfaces (APIs) to access and send emails, and to otherwise interact with email messages and an associated email inbox. Email data may be communicated between computing devices and servers via Simple Mail Transfer Protocol (SMTP), Post Office Protocol (POP), and/or Internet Message Access Protocol (IMAP), for example. Once an email is sent to a recipient, the content of the sent email is considered static or fixed. In contrast, a note provided within an email message is considered live and editable by practically any number of users in real-time.

Client-Side Implementations of Live Notes

Figure 2:
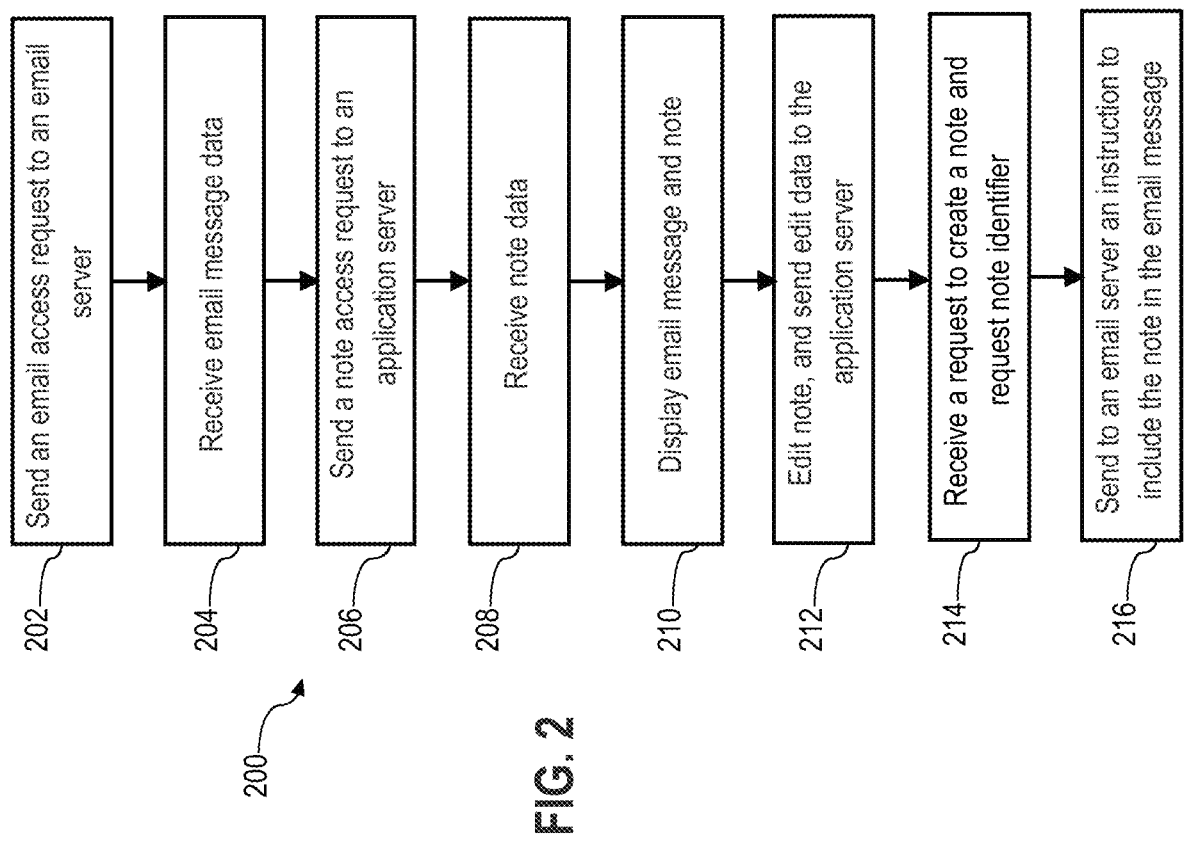
FIG. 2 is a flowchart for providing an integrated productivity tool according to an embodiment.

FIG. 2 is a flowchart for providing an integrated productivity tool according to an embodiment. Flowchart 200 of FIG. 2 may be implemented by a client computing device, such as computing device 102 of FIG. 1 or computing device 1200 of FIG. 12. The computing device includes a software system, such as the software system 1300 of FIG. 13. The computing device utilizes the software system to execute instructions to provide a computer-implemented application that integrates email and real-time collaboration functionality in a consolidated interface displayed on a display device. The computing device receives input from one or more input devices to control functionality of the application. The computing device may provide the productivity application as an application executing on the computing device, and/or may execute instructions that are received from one or more other computing devices, such as an application server and an email server connected to the computing device through a wired or wireless network.

Although blocks 202-216 are illustrated in order, the blocks may also be performed in parallel, and/or in a different order than described herein. Flowchart 200 may also include additional or fewer blocks, as needed or desired. For example, blocks 202-216 can be combined into fewer blocks, divided into additional blocks, and/or removed based upon a desired implementation.

At block 202, a computing device sends an email access request to an email server. The computing device may send the email access request via an API compatible with the email server. The email access request may include login information for an email account managed by the email server, and one or more email message identifiers and/or email message thread identifiers. According to an example, an identifier of an email message or email message thread may be generated by an email server and stored or is otherwise accessible by the computing device. The computing device may send the email access request when a client application connects or logs-in to a particular email account to access a corresponding email inbox. In another example, the computing device may send the email access request just when the client application receives an input corresponding to a user clicking-on or otherwise requesting access to a particular email message in the email inbox.

At block 204, in response to sending the email access request, the computing device receives, from the email server, email message data for one or more email messages corresponding to the email account. The email message data may include, for each email message, content of the email, an email message identifier and/or an email message thread identifier, and sender and recipient email addresses, for example. The computing device is configured to use the email message data to render or display the one or more email messages on a display device.

According to an embodiment, at block 204, the email message data includes or otherwise specifies one or more note identifiers. In an example, the email message data includes one or more links that are used to determine the one or more note identifiers. Each note identifier corresponds to a live, interactive note within an email message. In an example, a given note identifier may correspond to a single note, including all content created by all users. In other examples, a given note identifier may correspond to a series of one or more live notes, to a subset of one or more live notes, and/or to a portion of one or more live notes. In a further example, different note identifiers may correspond to portions of one or more live notes entered by different users or email accounts.

At block 206, the computing device sends a note access request to an application server. The note access request may include one or more note identifiers received at block 204, or a subset of those one or more note identifiers. The note access request may include one or more note identifiers from within a single email message or from within multiple email messages that are part of a common email thread. According to an embodiment, at block 206, the computing device parses note identifiers from note links in the email message data received at block 204. The computing device uses note identifier(s) to create the note access request, and sends the note access quest to the application server to retrieve note data corresponding with one or more note identifiers.

At block 208, in response to sending the note access request, the computing device receives, from the application server, note data for one or more notes that correspond to the one or more note identifiers. The computing device is configured to store and use the received note data to render or display the one or more notes on a display device. As discussed above, the note data may include or otherwise be based on CRDT data that tracks keystroke operations, which define content of each note. At block 210, the computing device uses the received email message data and the note date to render or display an interface that includes the one or more notes within, or in-line with, an email message or email thread.

At block 212, the computing device receives input, e.g., edit operations, to edit a note. Further, at block 212, the computing device sends corresponding edit data, such as CRDT data for each edit operation or keystroke as each is entered, to the application server. The functions of block 210 and block 212 allow user accounts or other recipients to edit, in real-time, a note within an email message.

At block 212, the computing device may also receive input to share or otherwise provide other user accounts access to the note. In an example, the displayed interface provides controls to select a note and enter one or more account identifiers, such as email addresses, to provide access to the selected note to one or more user accounts associated with the one or more account identifiers. In this example, the edit data sent to the application server may also include one or more account identifiers granted access to a selected note.

In another example, the displayed interface includes controls to copy or otherwise provide a note link for a selected note. The note link can then be shared electronically with other users, and the other users may use a computing device to open the note link to access and interact with the selected note. In this example, the computing device at block 212 may not send account identifiers to the application server. Instead, any user with the note link may access a selected note, unless other privacy or security controls limit public note access.

Further, the displayed interface includes controls to edit, send, and otherwise interact with the email message. The interface further provides note controls to add and edit notes within merged messages. This functionality allows a user to consolidate otherwise distinct email message and provide real-time, interactive notes to facilitate collaboration on consolidated content.

At block 214, the computing device receives input to create a new note, which may be added to an email message. In an embodiment, upon receiving the input to create a new note, the computing device sends a request to an application server for a unique note identifier for the new note, and the computing device stores the note identifier after the identifier is received from the application server. The computing device uses the note identifier to construct a link for the new note.

At block 216, the computing device receives a request or instruction to include a note in an email message. Upon receiving an instruction to save a draft of the email message and note, or send the email message and note to one or more recipients, the computing device sends instructions to the email server to include the note within the email message, such as by adding the note link constructed at block 214 into a body of the email message. Opening or following the note link in the email message directs a computing device to the application server to retrieve associated note data used to render and display the note. At block 216, the computing device uses a compatible API to send instructions to the email server.

Server-Side Implementations of Live Notes

Figure 3:
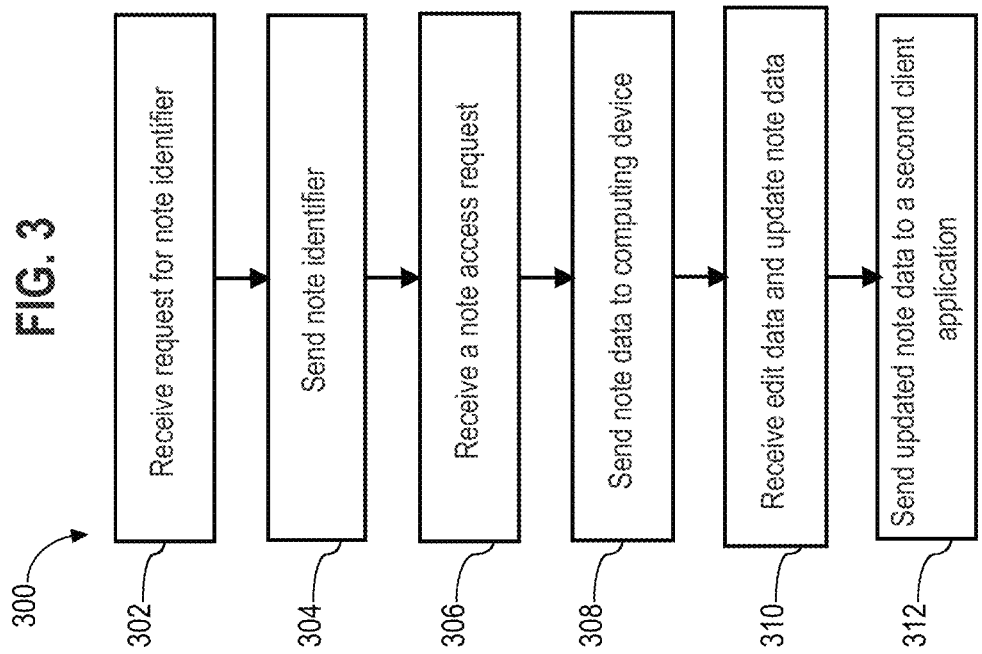
FIG. 3 is a flowchart for providing an integrated productivity tool according to an embodiment.

FIG. 3 is a flowchart for providing an integrated productivity tool according to an embodiment. Flowchart 300 of FIG. 3 may be implemented by a server, such as application server 106 of FIG. 1, which may include various components of computing device 1200 of FIG. 12. A server also includes a software system, such as the software system 1300 of FIG. 13. The server utilizes a software system to execute instructions and support the computer-implemented application that integrates email and real-time collaboration functionality in a consolidated interface displayed on a display device.

Although blocks 302-312 are illustrated in order, the blocks may also be performed in parallel, and/or in a different order than described herein. Flowchart 300 may also include additional or fewer blocks, as needed or desired. For example, blocks 302-312 can be combined into fewer blocks, divided into additional blocks, and/or removed based upon a desired implementation.

At block 302, the application server receives a request for a note identifier. The request for the note identifier may be sent from a computing device at block 214, for example. At block 304, the application sends the requested note identifier to the computing device that sent the request.

At block 306, the application server receives a note access request from a computing device. The computing device that provides the received note access request of block 306 may be the same computing device that provided the note identifier request of block 302, or may be a different computing device. The note access request specifies one or more note identifiers, and may also include an account identifier of an account requesting access to the note. In an example, the note access request is sent by a computing device at block 206 of FIG. 2, and/or is sent by a computing device granted access at block 212 of FIG. 2.

At block 308, the application server sends note data, which corresponds to one or more note identifiers specified by the note access request, to the computing device that sent the note access request of block 306. According to an embodiment, the application server implements access controls to selectively provide note data to a computing device if an account identifier associated with the computing device is authorized to access the note. Some notes, however, may be labeled as public or otherwise accessible to any user that has access to the note link. The note data may be based on stored CRDT data associated with the one or more note identifiers, and/or may include the CRDT data itself. The computing device, and more particularly, the client application of the computing device, are configured to use the note data to cause a display device to display the note in-line with an email message. For example, a client application may display the note and email message as in block 210 and 212 of FIG. 2.

At block 310, the application server receives, from a computing device, edit data for performing an edit operation to content of a note. The application, at block 310, receives a note identifier for the edited note, and updates and stores note data corresponding to the received note identifier. The computing device that provides the edit data of block 310 may be the same computing device that provided the edit request of block 302, or that provided the note access request of block 306, or may be a different computing device. The edit data of block 310 may be the same or similar to edit data of block 212 of FIG. 2.

According to an embodiment, the application server receives edit data from a client application provided by a computing device, and a note identifier accompanies the note data. Although, in an example, the application server generates and stores a new note identifier upon receiving the edit data, and further communicates the new note identifier to the computing device. In this embodiment, the note data includes edit operations that define content of the note, for example, CRDT data associated with a corresponding note identifier. In an example, the edit data is accompanied by an account identifier of an account that sends a request to edit the note. At block 310, the application server may use the account identifier and the note identifier to determine whether the account is authorized to access and edit the note.

At block 312, the application server sends updated note data from block 310 to another computing device to enable the other computing device to display an edited note in real-time. In an example, the application server sends the updated note data in response to a note access request sent by the other computing device. In another example, the application server identifies one or more other computing devices, or one or more accounts associated with one or more other computing devices, that have been granted access to the note, or that have previously sent a note access request for the note, and automatically and in real-time sends the updated note data to each of the identified one or more other computing devices.

Example Application Interfaces

Figure 4:
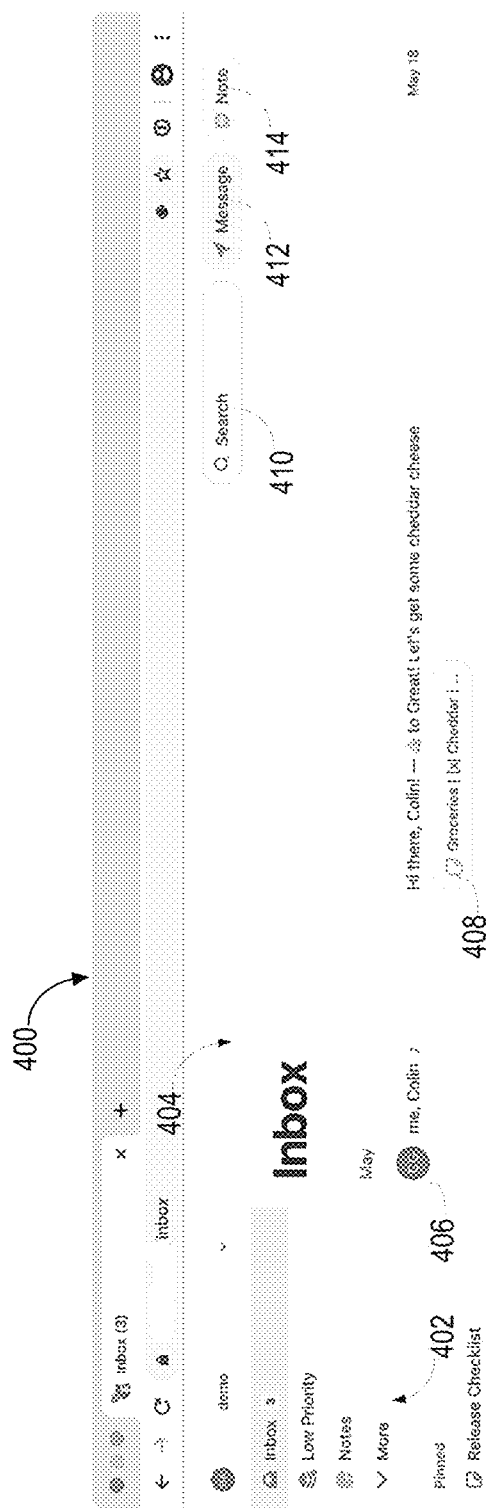
FIG. 4 illustrates an example graphical user interface (GUI) of an email inbox according to an embodiment.

FIG. 4 illustrates an example GUI of an email inbox according to an embodiment. In an embodiment, FIG. 4 illustrates a computer display device coupled to a computing device 102 that has received instructions, such as dynamic HTML code, from application server 106 and/or email server 108, and rendered and displayed the instructions to render an email inbox GUI 400 using a web browser, other HTML client, or other client application 110 that executes at the computing device 102.

In this example, GUI 400 comprises a plurality of view links 402 which, when selected via input using a pointing device or keyboard command, cause dynamically generating a view in a central panel 404. In FIG. 4, an Inbox link has been selected, causing the application server 106 to generate code that can be rendered to show an inbox display. In an embodiment, an email inbox panel 404 includes one or more rows each having one or more icons 406 representing email messages or threads. In an embodiment, each row representing an email message or thread comprises a sender identifier, a subject, and a date. Sender identifiers may be any user identifier or account identifier, address, or label. The subject may be rendered in whole or in part.

In an embodiment, each row further comprises one or more icons 408 representing notes that are integrated with and/or provided within or displayable with the email message or threads. In the GUI 400, an icon 408 for a note is provided below and offset from an icon 406 for an email to indicate that the note is integrated within the email. However, other embodiments may display the icons in different positions.

The GUI 400 also includes a search box 410 that is used to perform a search across emails and/or notes using search terms entered into the search box 410. In response to entering search terms in the box 410, the client application 110 sends the search terms to the application server 106 and/or the email server 108, which use the search terms to search across note and/or email content and metadata, and return results of the search to the client application 110.

The GUI further includes a control 412 to create a new email message, and a control 414 to create a new note or edit an existing note. In an embodiment, the control 414 may be used to create a new note or edit an existing note disassociated with any specific email message. For instance, a new note may be created and saved using control 414, and then later included into an email message as desired.

In an embodiment, client application 110 requests and receives email message data from email server 108, and requests and receives note data from application server 106. In this embodiment, the client application 110 executes code from the application server 106, and uses the email message data from the email server 108 and the note data from the application server 106 to render the GUI 400.

FIG. 5 illustrates an example GUI of an email with an in-line note according to an embodiment. In an embodiment, the application server 106 is programmed to receive input in the GUI 400 of FIG. 4 to select a specific message or thread and, in response, to generate code that can be rendered at the computing device 102 to display an email GUI 500 of FIG. 5. Thus, to generate FIG. 5, a user has selected an email message or email thread that includes a note, or has added a new note to the email message or thread, with all such operations involving using input devices to select objects in the GUI 400 of FIG. 4. The client application 110 transmits the selections to the application server 106 for generating responsive display code.

FIG. 5 illustrates an email GUI 500 for one or more email messages 502 that includes static email content 504 and one or more notes 506 provided in-line as a continuous portion of the displayed GUI 500 including email messages 502. A particular note may include one or more sections of one or more lines of text and/or other content, such as free-form text, structured to-do or checklists, tables, media, and the like. A note may be visually distinguished from static email content and from other notes with a distinct border 508 around the note, for example. Notes are also distinguished from other notes by unique note IDs.

In an example, the GUI 500 is configured to receive input to move a cursor 510 over a note and select the note to directly edit the note. In an example, a user may move the cursor 510 over a section of a note, select the section, and edit the selected section. The user may edit a section of a note, for instance, by typing text, deleting text or other content, selecting/deselecting a checkbox or bubble, and the like. FIG. 5 illustrates that a selected section of a note is identified by a handle 512. Selecting the handle 512 also provides functionality to rearrange sections of a note. In an example, a user selects a handle 512 for a section of a note, and drags-and-drops the handle and note section at a desired position within the note. This functionality is useful to rearrange and organize notes by subject matter and/or recipient, for example.

In response to selecting a note, the client application 110 identifies a note ID for the corresponding note and, as the note is edited, the client application stores edit data and also sends edit data (e.g., CRDT data) along with the note ID to the application server 106. The application server 106 stores the edit data in association with the corresponding note ID.

In an embodiment, GUI 500 also provides one or more controls to edit or manage a note. For example, FIG. 5 illustrates a control 514 that may be selected to enter other accounts or recipients and to thereby assign an associated portion of a note to a specified account or recipient. In response to selecting the control 514 using the cursor 510, for example, and entering an account or recipient, the client application 110 sends corresponding data, such as a note ID and an account or recipient identifier, to the application server 108. The application server 108 stores this data and is configured to use the data to notify the account or recipient of the assignment and to push updated note content, in real-time, to each respective, assigned account or recipient.

The GUI 500 also provides a control 516 to add a comment to a selected section of a note. Selecting a control 518 provides options to share a note by emailing the note, copy a shareable note link, and open the note in a separate window, for instance. In an example, in response to a user selecting the control 516, the client application copies a note link for a corresponding note. The client application may then send, electronically, the note link to an account specified by an account identifier. In another example, the computing device may send the note link to a specified account using some other application. Another control 520 provides additional options, for instance, to duplicate the note. Selecting control 520 may also display a pop-up window including information about the note, such as email message(s) in which the note appears, a most recent edit time/date, and information on an account that created the note and a time/date of creation.

In this example, the GUI 500 is also configured to allow a user to respond with an email message in the email thread via a reply box 522. Accordingly, a user may selectively edit a note and an email in the same GUI 500. In response to selecting the reply box 522 using the cursor 510, for example, and entering and sending text or other content, the client application 110 sends corresponding data, such as an email message or thread ID, any associated note ID, the text or other content, and a recipient account identifier to the email server 108. The email server 108 uses this data to send an email with the static text or other content and including a link to the note(s) to designated recipient account(s).

In the present example, the reply box 522 further includes a control 524 to attach file into the reply email message, a control 526 to forward the reply email message to one or more other user accounts, a control 528 to expand the reply email message in a separate portion of the GUI, and a control 530 to send the email message.

Figure 6:
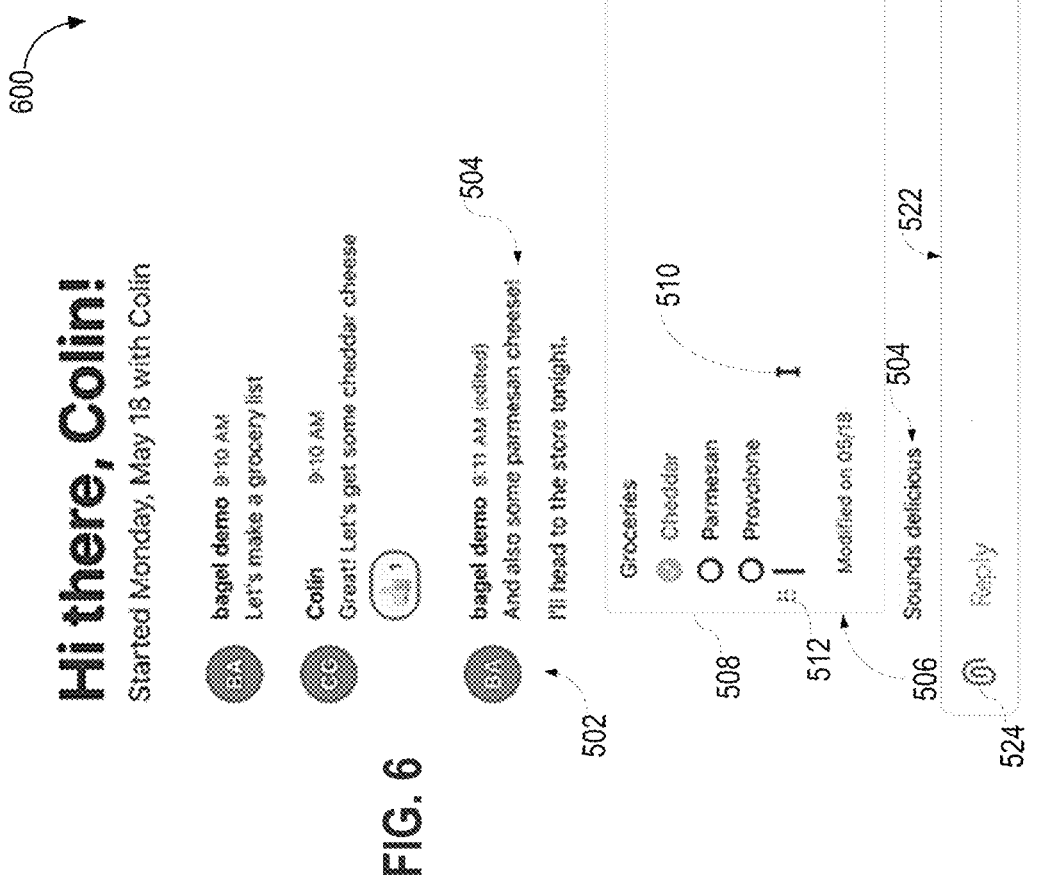
FIG. 6 illustrates an example GUI of an email with an in-line note according to an embodiment.

FIG. 6 illustrates an example GUI of an email with an in-line note according to an embodiment. GUI 600 of FIG. 6 is similar to GUI 500 of FIG. 5, and illustrates additional controls to edit and manage a note. More particularly, the GUI 600 includes a control 602 to format or organize text in the form of a checklist or other to-do-type list, and a control 604 to format or organize text in the form of a table in the selected note section.

GUI 600 also includes a control 606 to split a section of a note into separately manageable sections. In an embodiment, in response to a user selecting the control 606 for a given note section, the GUI 600 splits the selected section and creates a new section containing a portion of the section that follows a text cursor position.

Other note functionality may include text and style tools to bold or italicize text, attaching media content, such as images and video, providing a polling function, and calendaring functions, such as creating and managing reminders for a particular note.

Figure 7:
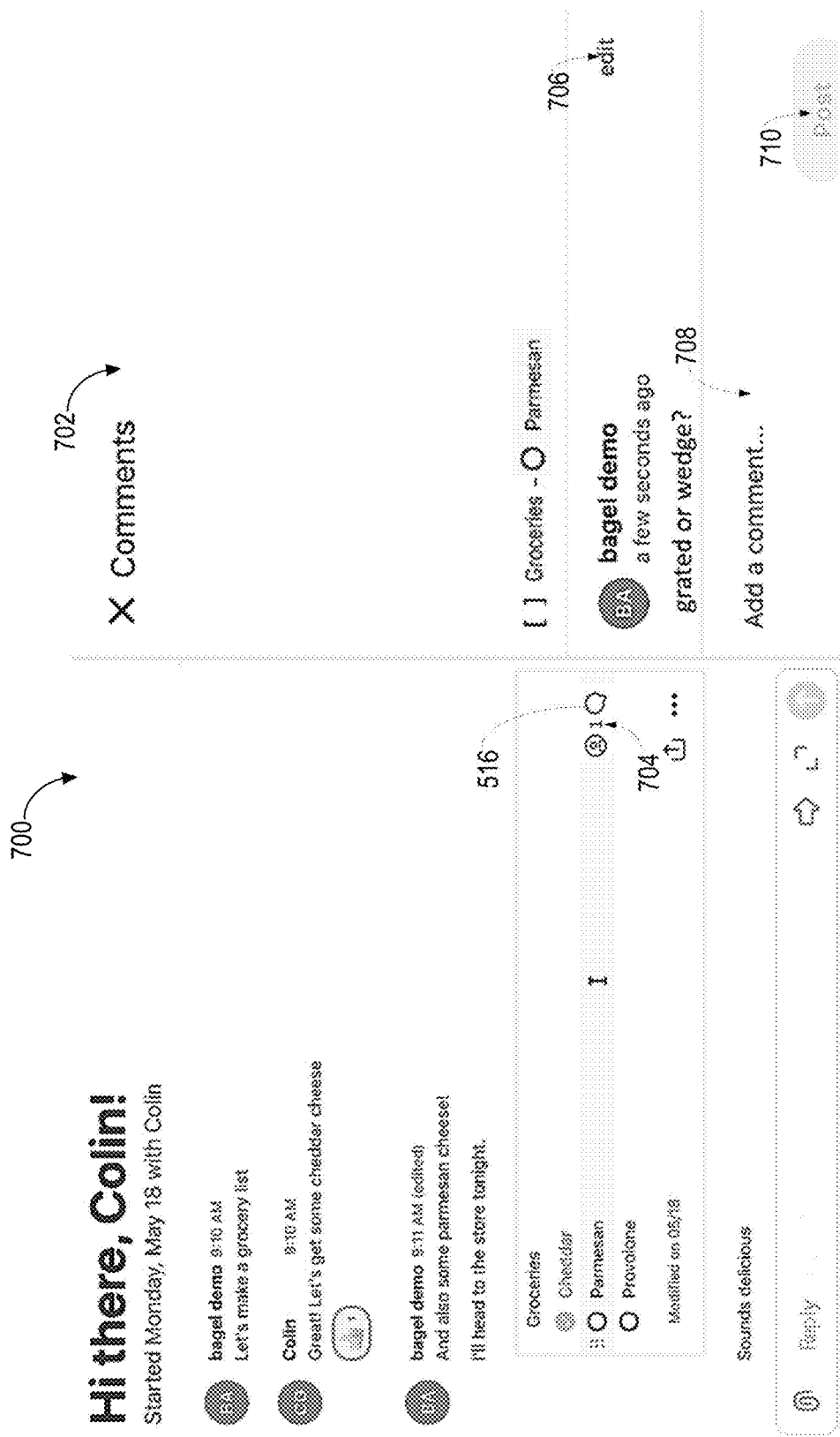
FIG. 7 illustrates an example GUI of an email with an in-line note and comment according to an embodiment.

FIG. 7 illustrates an example GUI of an email with an in-line note and comment according to an embodiment. GUI 700 of FIG. 7 is similar to GUIs of FIG. 5 and FIG. 6, and illustrates a comment section 702 associated with a note but positioned separately from email and note content. In response to a user selecting a control 516, the GUI 700 provides a corresponding comment section 702 to add or view a comment associated with a selected note section. The comment section 702 specifies the corresponding note, which in FIG. 7 relates to a "Parmesan" entry in a "Groceries" checklist. In this example, an icon 704 positioned adjacent the selected control 516 highlights a number of comments associated with the note section. In the comment section 702, a user may view comments, edit an existing comment via selection of an edit control 706, add a new comment via edits in text box 708, and may save edits/additions via selection of a post control 710. This functionality is useful to provide an additional interactive, live conversation on a particular note. In an embodiment, the client application 110 sends a comment ID and comment edit data (e.g., CRDT data) to the application server 106 as a comment is edited.

Figure 8:
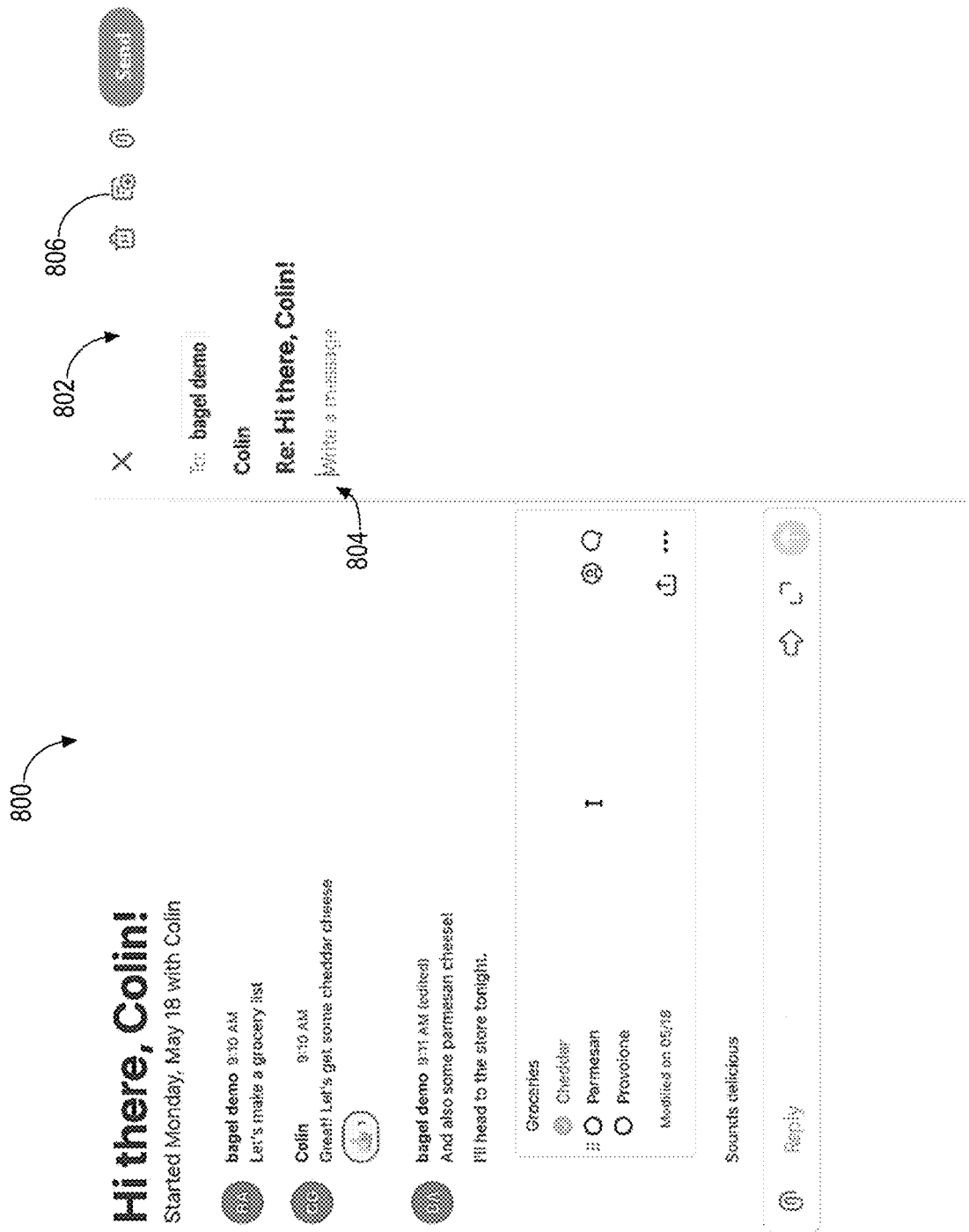
FIG. 8 illustrates an example GUI of an email with an in-line note and email edit options according to an embodiment.

FIG. 8 illustrates an example GUI of an email with an in-line note and email edit options according to an embodiment. GUI 800 of FIG. 8 is similar to the GUIs of FIG. 5 through FIG. 7, and illustrates a message section 802 associated with email messages or an email thread on a left portion of the GUI. In response to a user selecting control 528 in email reply box 522, the GUI 800 provides message section 802 with additional options and controls to respond with an email message and/or live notes. More particularly, message section 802 includes an email message portion 804 for editing the email message, and a control 806 to add a note in the email message.

Figure 9:
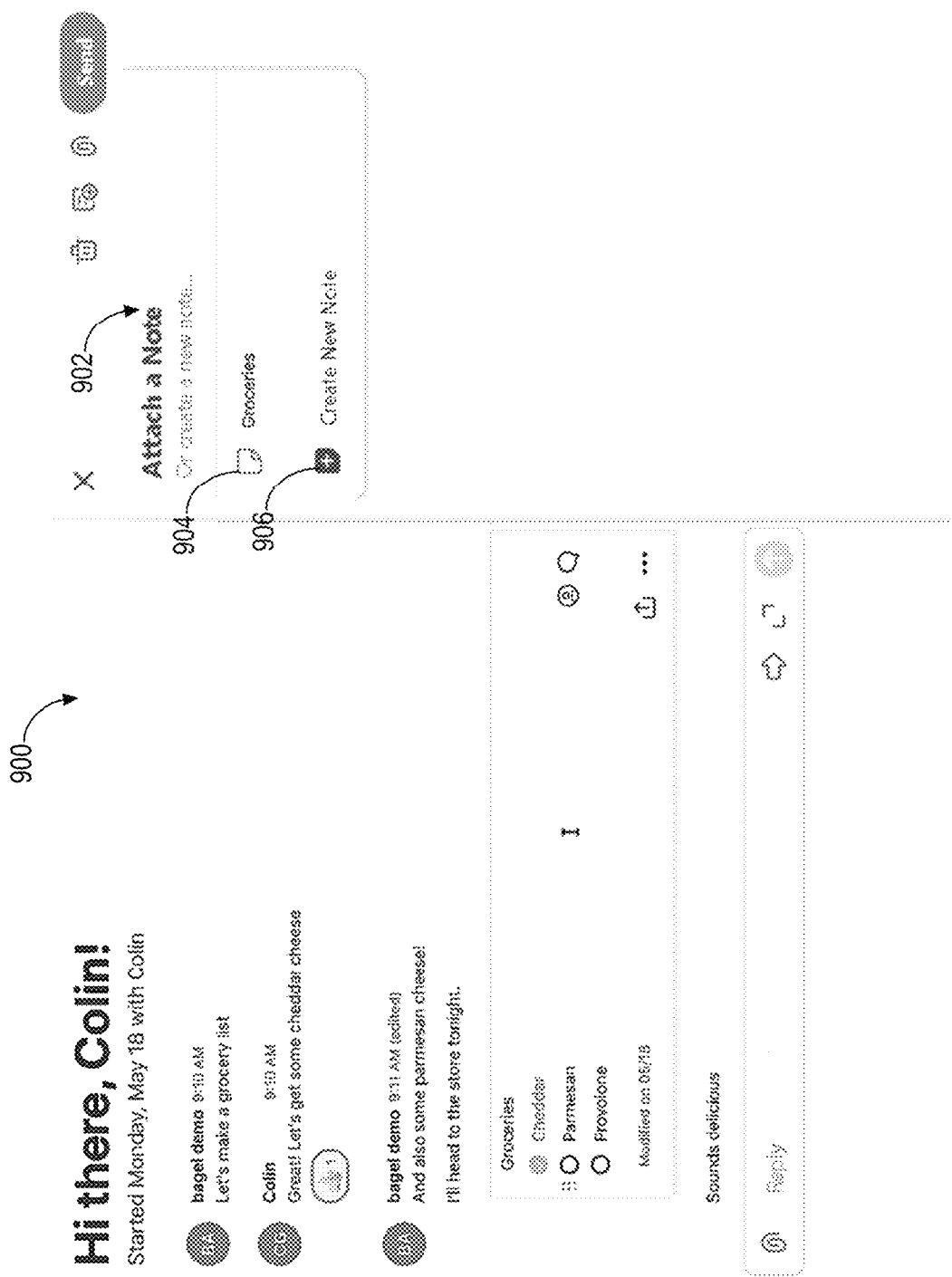
FIG. 9 illustrates an example GUI of an email with an in-line note and note edit options according to an embodiment.

FIG. 9 illustrates an example GUI of an email with an in-line note and note edit options according to an embodiment. GUI 900 of FIG. 9 is similar to the GUIs of FIG. 5 through FIG. 8. In response to a user selecting control 806 in the message section 802 of FIG. 8, the GUI 900 provides note options 902 to add an existing note (e.g., "Groceries" checklist) or create a new note. In the present example, the note options include a selectable icon 904 to insert an existing note, and a selectable icon 906 to create a new note.

Figure 10:
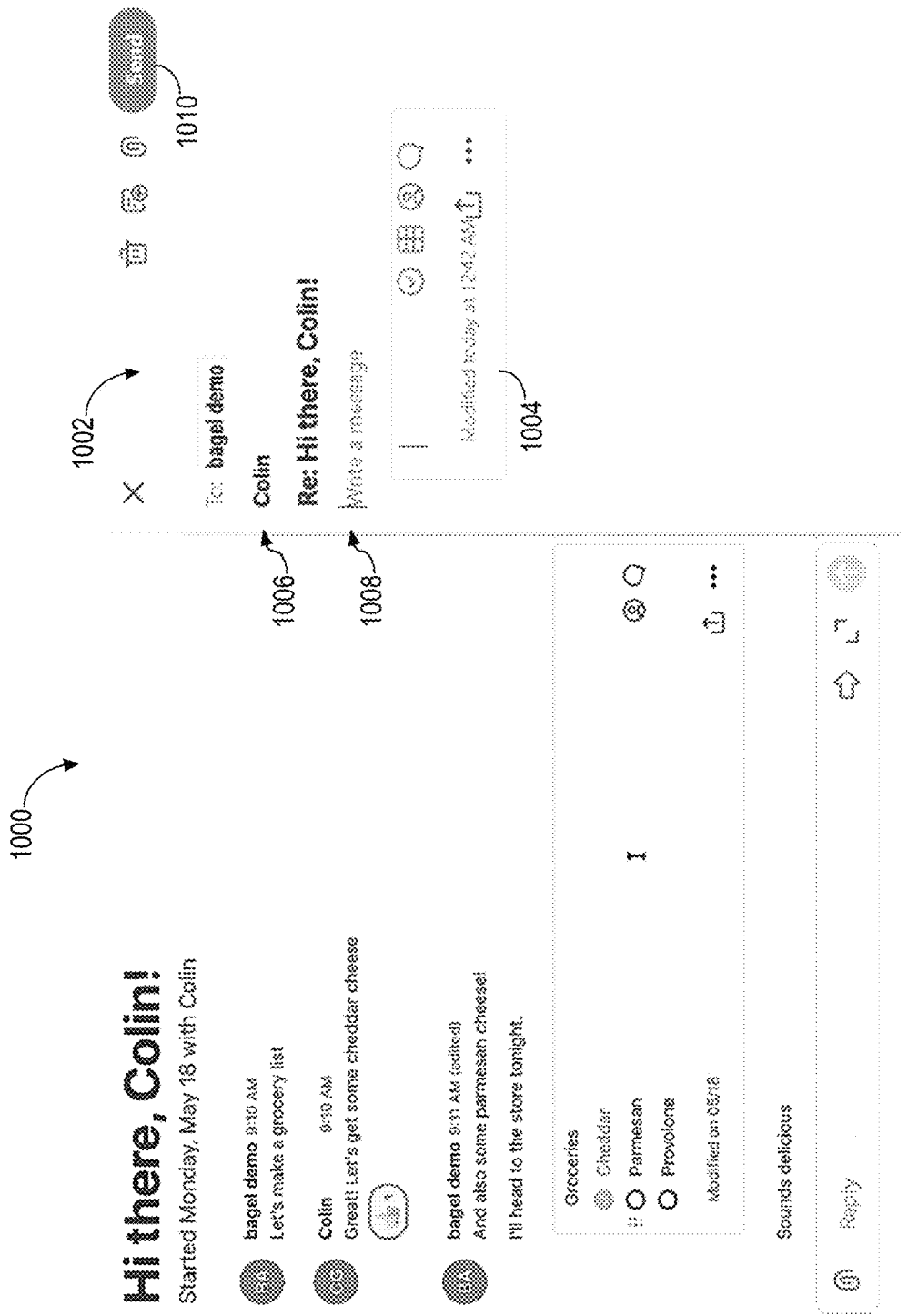
FIG. 10 illustrates an example GUI of an email with an in-line note and email and note edit options according to an embodiment.

FIG. 10 illustrates an example GUI of an email with an in-line note and email and note edit options according to an embodiment. GUI 1000 of FIG. 10 is similar to the GUIs of FIG. 5 through FIG. 9. In response to a user selecting icon 906 in the note options 902 of FIG. 9, the GUI 1000 inserts a new editable note block 1004 in an email message 1006. The email message includes a "To" field to specify recipients, a from field (e.g., "Colin") to identify a sender account, a subject line (e.g., "Hi there, Colin!," and a text entry portion 1008 to edit and compose the email with static content. The note block 1004 provides similar controls and functionality to edit and manage a note, as discussed above. GUI 1000 further includes a send control 1010 to finalize and send the email message and any in-line note to specified recipient accounts.

Figure 11:
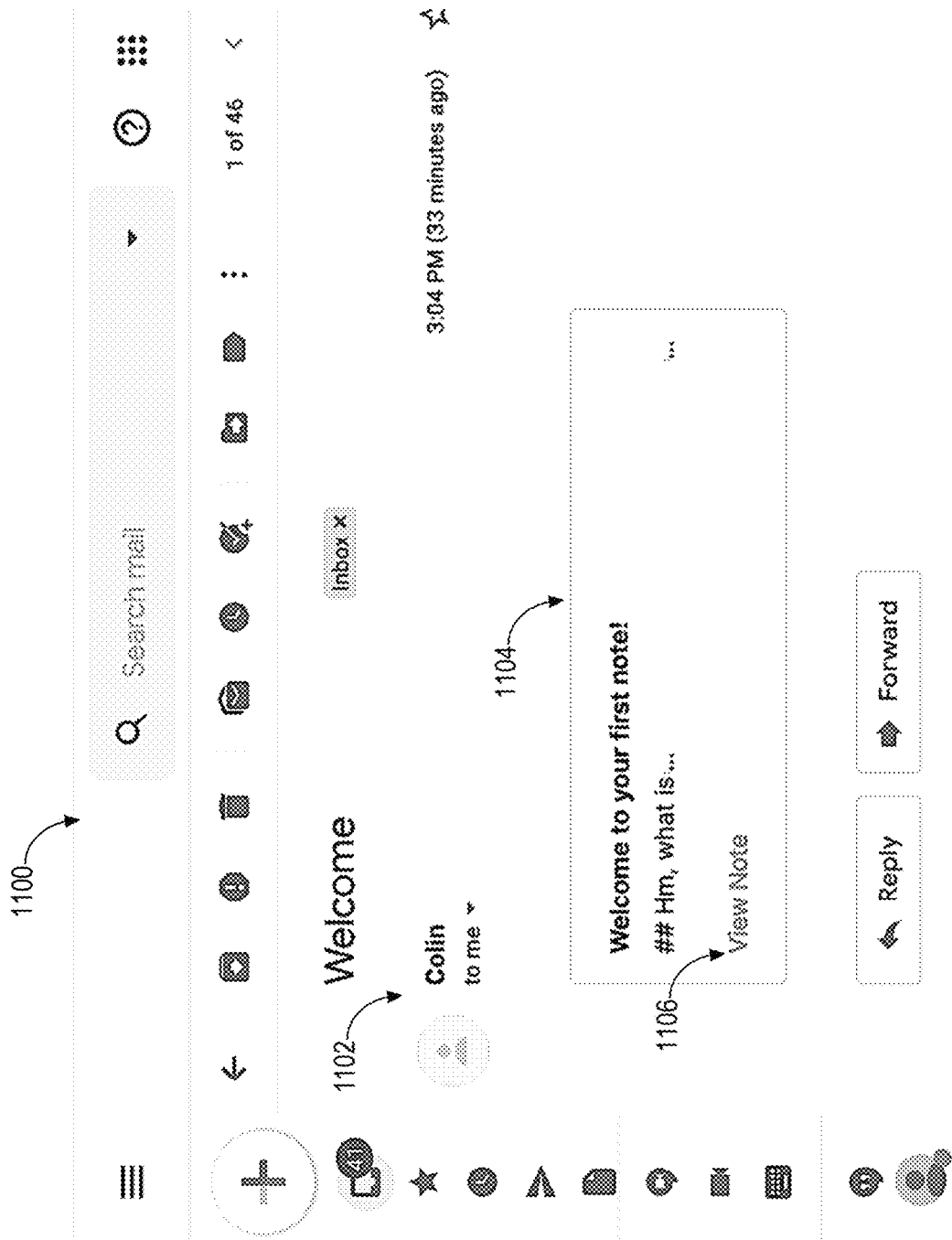
FIG. 11 illustrates an example GUI of an email with an in-line note link according to an embodiment.

FIG. 11 illustrates an example GUI of an email with an in-line note link according to an embodiment. GUI 1100 illustrates an email message 1102 with an included a note block 1104. More particularly, the note block 1104 includes a summary of note content (e.g., "Hm, what is . . . ") and a note link 1106, which may be opened to direct an application on a computing device to application server 106 to request and retrieve note content. According to an embodiment, GUI 1100 provides an example when an email with an in-line note is opened by a different application from client application 110. In contrast, FIG. 5, for example, illustrates a GUI 500 when an email with an in-line note is opened by the client application 110, which includes note content in-line with email content.

Hardware Overview

Figure 12:
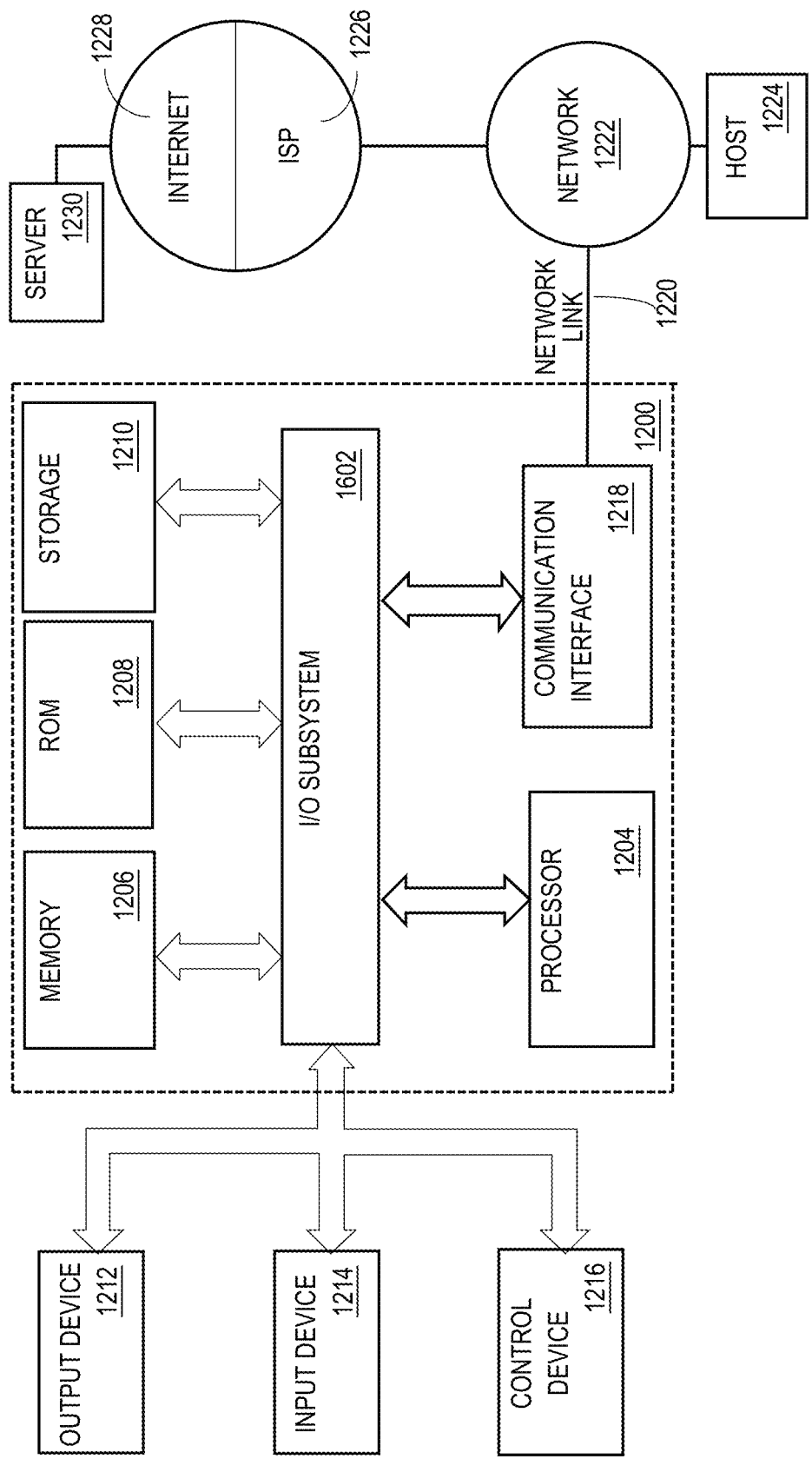
FIG. 12 is a block diagram of a computing device that may be used to implement an embodiment.

Referring now to FIG. 12, it is a block diagram that illustrates a basic computing device 1200 in which the example embodiment(s) of the present disclosure may be embodied. Computing device 1200 and its components, including their connections, relationships, and functions, is meant to be illustrative, and not meant to limit implementations of the example embodiment(s). Other computing devices suitable for implementing the example embodiment(s) may have different components, including components with different connections, relationships, and functions.

Computing device 1200 may include a bus 1202 or other communication mechanism for addressing main memory 1206 and for transferring data between and among the various components of device 1200.

Computing device 1200 may also include one or more hardware processors 1204 coupled with bus 1202 for processing information. A hardware processor 1204 may be a general purpose microprocessor, a system on a chip (SoC), or other processor.

Main memory 1206, such as a random access memory (RAM) or other dynamic storage device, also may be coupled to bus 1202 for storing information and software instructions to be executed by processor(s) 1204. Main memory 1206 also may be used for storing temporary variables or other intermediate information during execution of software instructions to be executed by processor(s) 1204.

Software instructions, when stored in storage media accessible to processor(s) 1204, render computing device 1200 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 1200 also may include read only memory (ROM) 1208 or other static storage device coupled to bus 1202 for storing static information and software instructions for processor(s) 1204.

One or more mass storage devices 1210 may be coupled to bus 1202 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 1210 (e.g., the main hard disk for the device) stores a body of program and data for directing operation of the computing device, including an operating system, user application programs, driver and other support files, as well as other data files of all sorts.

Computing device 1200 may be coupled via bus 1202 to display 1212, such as a liquid crystal display (LCD) or other electronic visual display, for displaying information to a computer user. In some configurations, a touch sensitive surface incorporating touch detection technology (e.g., resistive, capacitive, etc.) may be overlaid on display 1212 to form a touch sensitive display for communicating touch gesture (e.g., finger or stylus) input to processor(s) 1204.

An input device 1214, including alphanumeric and other keys, may be coupled to bus 1202 for communicating information and command selections to processor 1204. In addition to or instead of alphanumeric and other keys, input device 1214 may include one or more physical buttons or switches such as, for example, a power (on/off) button, a "home" button, volume control buttons, or the like.

Another type of user input device may be a cursor control device 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

While in some configurations, such as the configuration depicted in FIG. 12, one or more of display 1212, input device 1214, and cursor control 1216 are external components (i.e., peripheral devices) of computing device 1200, some or all of display 1212, input device 1214, and cursor control 1216 are integrated as part of the form factor of computing device 1200 in other configurations.

Functions of the disclosed systems, methods, and modules may be performed by computing device 1200 in response to processor(s) 1204 executing one or more programs of software instructions contained in main memory 1206. Such software instructions may be read into main memory 1206 from another storage medium, such as storage device(s) 1210. Execution of the software instructions contained in main memory 1206 cause processor(s) 1204 to perform the functions of the example embodiment(s).

While functions and operations of the example embodiment(s) may be implemented entirely with software instructions, hard-wired or programmable circuitry of computing device 1200 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 1210. Volatile media includes dynamic memory, such as main memory 1206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more software instructions to processor(s) 1204 for execution. For example, the software instructions may initially be carried on a magnetic disk or solid-state drive of a remote computer. The remote computer can load the software instructions into its dynamic memory and send the software instructions over a telephone line using a modem. A modem local to computing device 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor(s) 1204 retrieves and executes the software instructions. The software instructions received by main memory 1206 may optionally be stored on storage device(s) 1210 either before or after execution by processor (s) 1204.

Computing device 1200 also may include one or more communication interface(s) 1218 coupled to bus 1202. A communication interface 1218 provides a two-way data communication coupling to a wired or wireless network link 1220 that is connected to a local network 1222 (e.g., Ethernet network, Wireless Local Area Network, cellular phone network, Bluetooth wireless network, or the like). Communication interface 1218 sends and receives electrical, electromagnetic, or optical signals that carry digital data streams representing various types of information. For example, communication interface 1218 may be a wired network interface card, a wireless network interface card with an integrated radio antenna, or a modem (e.g., ISDN, DSL, or cable modem).

Network link(s) 1220 typically provide data communication through one or more networks to other data devices. For example, a network link 1220 may provide a connection through a local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network(s) 1222 and Internet 1228 use electrical, electromagnetic or optical signals that carry digital data streams. The signals through the various networks and the signals on network link(s) 1220 and through communication interface(s) 1218, which carry the digital data to and from computing device 1200, are example forms of transmission media.

Computing device 1200 can send messages and receive data, including program code, through the network(s), network link(s) 1220 and communication interface(s) 1218. In the Internet example, a server 1230 might transmit a requested code for an application program through Internet 1228, ISP 1226, local network(s) 1222 and communication interface(s) 1218.

The received code may be executed by processor 1204 as it is received, and/or stored in storage device 1210, or other non-volatile storage for later execution.

Software Overview

Figure 13:
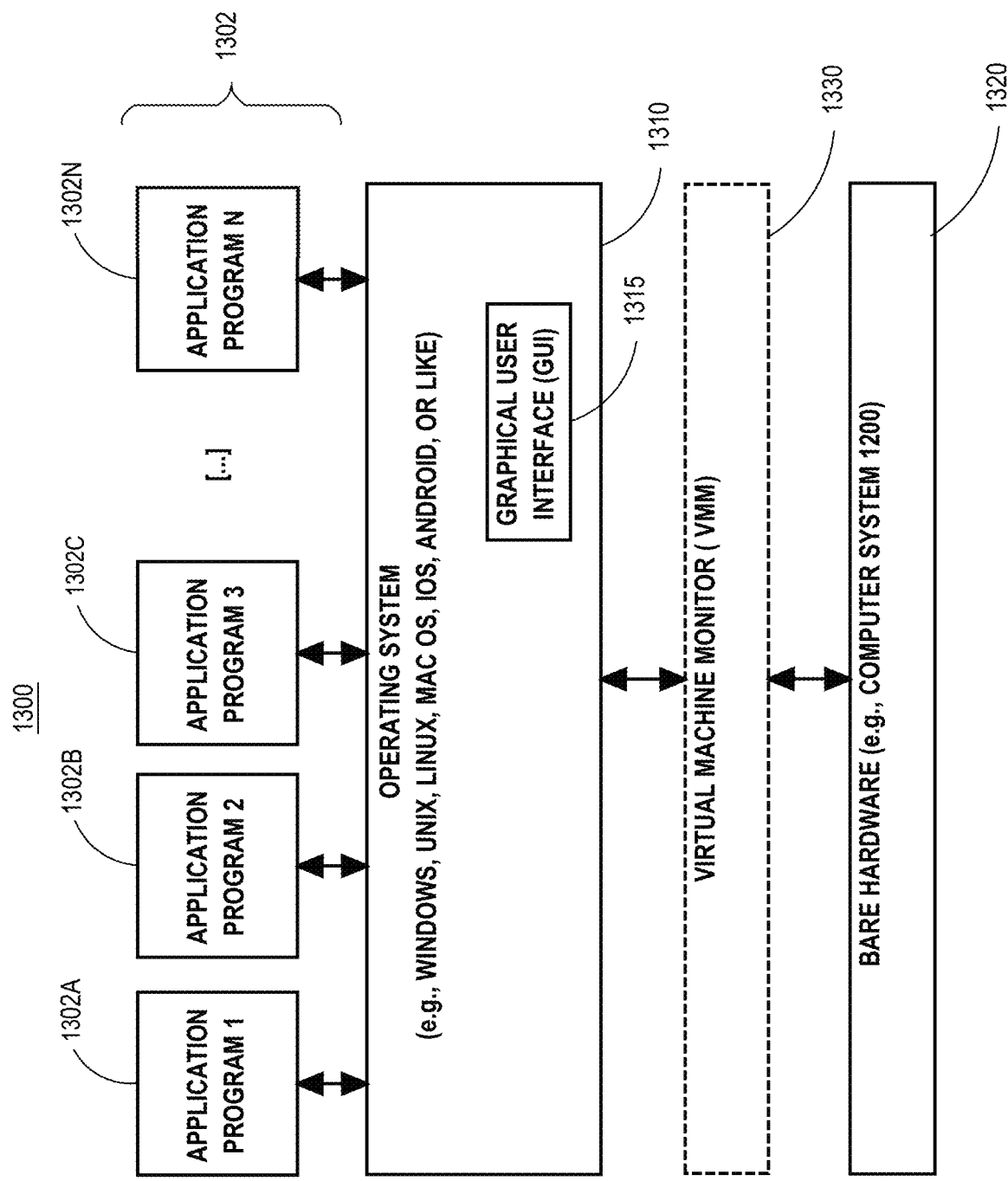
FIG. 13 is a block diagram of a software system for controlling the operation of the computing device of FIG. 12.

FIG. 13 is a block diagram of a software system 1300 that may be employed for controlling the operation of computing device 1200. Software system 1300 and its components, including their connections, relationships, and functions, is meant to be illustrative, and not meant to limit implementations of the example embodiment(s). Other software systems suitable for implementing the example embodiment(s) may have different components, including components with different connections, relationships, and functions.

Software system 1300 is provided for directing the operation of computing device 1200. Software system 1300, which may be stored in system memory (RAM) 1206 and on fixed storage (e.g., hard disk or flash memory) 1210, includes a kernel or operating system (OS) 1310.

The OS 1310 manages low-level aspects of computer operation, including managing execution of processes, memory allocation, file input and output (I/O), and device I/O. One or more application programs, represented as 1302A, 1302B, 1302C . . . 1302N, may be "loaded" (e.g., transferred from fixed storage 1210 into memory 1206) for execution by the system 1300. The applications or other software intended for use on device 1200 may also be stored as a set of downloadable computer-executable instructions, for example, for downloading and installation from an Internet location (e.g., a Web server, an app store, or other online service).

Software system 1300 includes a graphical user interface (GUI) 1315, for receiving user commands and data in a graphical (e.g., "point-and-click" or "touch gesture") fashion. These inputs, in turn, may be acted upon by the system 1300 in accordance with instructions from operating system 1310 and/or application(s) 1302. The GUI 1315 also serves to display the results of operation from the OS 1310 and application(s) 1302, whereupon the user may supply additional inputs or terminate the session (e.g., log off).

OS 1310 can execute directly on the bare hardware 1320 (e.g., processor(s) 1204) of device 1200. Alternatively, a hypervisor or virtual machine monitor (VMM) 1330 may be interposed between the bare hardware 1320 and the OS 1310. In this configuration, VMM 1330 acts as a software "cushion" or virtualization layer between the OS 1310 and the bare hardware 1320 of the device 1200.

VMM 1330 instantiates and runs one or more virtual machine instances ("guest machines"). Each guest machine comprises a "guest" operating system, such as OS 1310, and one or more applications, such as application(s) 1302, designed to execute on the guest operating system. The VMM 1330 presents the guest operating systems with a virtual operating platform and manages the execution of the guest operating systems.

In some instances, the VMM 1330 may allow a guest operating system to run as if it is running on the bare hardware 1320 of device 1200 directly. In these instances, the same version of the guest operating system configured to execute on the bare hardware 1320 directly may also execute on VMM 1330 without modification or reconfiguration. In other words, VMM 1330 may provide full hardware and CPU virtualization to a guest operating system in some instances.

In other instances, a guest operating system may be specially designed or configured to execute on VMM 1330 for efficiency. In these instances, the guest operating system is "aware" that it executes on a virtual machine monitor. In other words, VMM 1330 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

EXTENSIONS AND ALTERNATIVES

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A computer-implemented method comprising:
    sending, by a client application to an email server, a first request to access an email message thread, of email messages, that is receivable by one or more recipients, wherein the first request comprises an email message thread identifier;
    receiving, by the client application in response to the first request, email message data including contents of email messages in the email message thread, the email message thread identifier, and one or more sender and recipient email addresses, the email message data specifying one or more note identifiers, wherein each note identifier corresponds to a first live and interactive note and a series of one or more second live and interactive notes, a subset of the one or more second live and interactive notes, and a portion of the one or more second live and interactive notes;
    sending, by the client application to an application server, a second request to access the note based on the one or more note identifiers or a subset of the one or more note identifiers;
    receiving, by the client application in response to the second request, note data that defines, at least in part, a content of the note of each of the live and interactive notes, wherein each of the live and interactive notes is displayed in real-time with the email message and collaboratively accessible by each of a sender and one or more recipients simultaneously;
    controlling, by the client application a display device to display, based at least in part on the email message data and the note data, the email message, and each of the live and interactive notes including the content of the note in-line as a continuous portion with the email message without accessing each of an email application and one or more other applications each having a distinct interface.

2. The method of claim 1, wherein the email message data includes a note link;
    and wherein sending the second request to access each live and interactive note includes opening the note link.

3. The method of claim 2, further comprising:
    copying, by the client application, the note link;
    sending, by the client application electronically, the note link to an account specified by an account identifier.

4. The method of claim 1, further comprising:
    receiving input including edit operations to edit each live and interactive note;
    as the edit operations are received, sending by the client application, edit data corresponding to the edit operations to the application server.

5. The method of claim 4, wherein the edit data includes conflict-free replicated data type (CRDT) data.

6. The method of claim 1, further comprising:
    receiving, by the client application, input to provide access to each live and interactive note that is displayed in-line as a continuous portion with the email message to one or more accounts associated with one or more account identifiers;
    sending, by the client application, the one or more account identifiers to the application server.

7. One or more non-transitory computer-readable storage media storing one or more sequences of program instructions which, when executed by one or more processors, cause the one or more processors to execute:
    sending, by a client application to an email server, a first request to access an email message thread, of email messages, that is receivable by one or more recipients, wherein the first request comprises an email message thread identifier;
    receiving, by the client application in response to the first request, email message data including contents of email messages in the email message thread, the email message thread identifier, and one or more sender and recipient email addresses, the email message data specifying one or more note identifiers, wherein each note identifier corresponds to a first live and interactive note and a series of one or more second live and interactive notes, a subset of the one or more second live and interactive notes, and a portion of the one or more second live and interactive notes;
    sending, by the client application to an application server, a second request to access the note based on the one or more note identifiers or a subset of the one or more note identifiers;

receiving, by the client application in response to the second request, note data that defines, at least in part, a content of the note of each of the live and interactive notes, wherein each of the live and interactive notes is displayed in real-time with the email message and collaboratively accessible by each of a sender and one or more recipients simultaneously;

controlling, by the client application a display device to display, based at least in part on the email message data and the note data, the email message, and each of the live and interactive notes including the content of the note in-line as a continuous portion with the email message without accessing each of an email application and one or more other applications each having a distinct interface.

8. The non-transitory computer-readable storage media of claim 7, wherein the email message data includes a note link; and further comprising sequences of instructions which when executed using the one or more processors cause executing sending the second request to access each live and interactive note includes opening the note link.

9. The non-transitory computer-readable storage media of claim 8, further comprising sequences of instructions which when executed using the one or more processors cause executing:

copying, by the client application, the note link;

sending, by the client application electronically, the note link to an account specified by an account identifier.

10. The non-transitory computer-readable storage media of claim 7, further comprising sequences of instructions which when executed using the one or more processors cause executing:

receiving input including edit operations to edit each live and interactive note;

as the edit operations are received, sending by the client application, edit data corresponding to the edit operations to the application server.

11. The non-transitory computer-readable storage media of claim 10, wherein the edit data includes conflict-free replicated data type (CRDT) data.

12. The non-transitory computer-readable storage media of claim 7, further comprising sequences of instructions which when executed using the one or more processors cause executing:

receiving, by the client application, input to provide access to each live and interactive note that is displayed in-line as a continuous portion with the email message to one or more accounts associated with one or more account identifiers;

sending, by the client application, the one or more account identifiers to the application server.

* * * * *